(12) United States Patent　(10) Patent No.: US 12,643,543 B2
Nose　(45) Date of Patent: Jun. 2, 2026

(54) DRIVING ASSISTANCE CONTROL DEVICE

(71) Applicant: HONDA MOTOR CO., LTD., Tokyo (JP)

(72) Inventor: Tsubasa Nose, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 151 days.

(21) Appl. No.: 18/694,510

(22) PCT Filed: Sep. 30, 2021

(86) PCT No.: PCT/JP2021/036105
§ 371 (c)(1),
(2) Date: Mar. 22, 2024

(87) PCT Pub. No.: WO2023/053331
PCT Pub. Date: Apr. 6, 2023

(65) Prior Publication Data
US 2025/0128710 A1　Apr. 24, 2025

(51) Int. Cl.
*B60W 30/16*　(2020.01)
*B60W 30/12*　(2020.01)
(Continued)

(52) U.S. Cl.
CPC ............ *B60W 30/16* (2013.01); *B60W 30/12* (2013.01); *B60W 50/00* (2013.01); *G06V 20/588* (2022.01);
(Continued)

(58) Field of Classification Search
CPC ...... B60W 30/16; B60W 30/12; B60W 50/00; B60W 2050/0083; B60W 2300/36;
(Continued)

(56) References Cited

U.S. PATENT DOCUMENTS 6,185,492 B1 *　2/2001　Kagawa ............... B62D 15/025
　　　　　　　　　　　　　　　　　701/28
6,637,787 B1 *　10/2003　Salvisberg ............... B62J 27/30
　　　　　　　　　　　　　　　　　180/219
(Continued)

FOREIGN PATENT DOCUMENTS

JP　　2007-272445　　10/2007
JP　　2019-169012　　10/2019
(Continued)

OTHER PUBLICATIONS

International Search Report and Written Opinion for International Application No. PCT/JP2021/036105 mailed on Dec. 14, 2021, 9 pages.

*Primary Examiner* — Fadey S. Jabr
*Assistant Examiner* — Faris Asim Shaikh
(74) *Attorney, Agent, or Firm* — Amin, Turocy & Watson, LLP

(57) ABSTRACT

Provided is a driving assistance control device for a saddle-riding vehicle, the device having: an inter-vehicle distance acquiring unit that acquires the inter-vehicle distance in the vehicle width direction between the own vehicle and a parallel traveling vehicle that is another saddle-riding vehicle traveling parallel in a lane that is the same lane in which the own vehicle is traveling; a road condition acquiring unit that acquires a condition of the road on which the own vehicle is traveling; a target inter-vehicle distance setting unit that sets a target inter-vehicle distance in the vehicle width direction between the own vehicle and the parallel traveling vehicle according to the condition of the road; and an operation assistance unit that assists a driving operation by the driver on the basis of the inter-vehicle distance and the target inter-vehicle distance.

4 Claims, 5 Drawing Sheets

(51) Int. Cl.
  *B60W 50/00* (2006.01)
  *G06V 20/56* (2022.01)

(52) U.S. Cl.
  CPC . *B60W 2050/0083* (2013.01); *B60W 2300/36* (2013.01); *B60W 2420/403* (2013.01); *B60W 2510/202* (2013.01); *B60W 2552/53* (2020.02); *B60W 2554/801* (2020.02)

(58) Field of Classification Search
  CPC ..... B60W 2420/403; B60W 2510/202; B60W 2552/53; B60W 2554/801; B60W 40/06; G06V 20/588; G08G 1/163; G08G 1/166; G08G 1/167
  See application file for complete search history.

(56) References Cited

U.S. PATENT DOCUMENTS

| | | | | |
|---|---|---|---|---|
| 8,473,144 | B1 | 6/2013 | Dolgov et al. | |
| 8,838,337 | B2 * | 9/2014 | Ueda ................... | G05D 1/0088 |
| | | | | 382/104 |
| 10,179,588 | B2 * | 1/2019 | Takamatsu ........... | B60W 10/20 |
| 10,252,748 | B2 * | 4/2019 | Sakaguchi .......... | B62D 15/026 |
| 11,127,300 | B2 * | 9/2021 | Kosaka ................ | B60W 40/04 |
| 11,242,056 | B2 * | 2/2022 | Han ...................... | B60W 40/06 |
| 11,465,627 | B2 * | 10/2022 | Oka ............... | B60W 60/00276 |
| 2004/0061626 | A1 * | 4/2004 | Kubota .................. | G08G 1/22 |
| | | | | 701/96 |
| 2009/0192710 | A1 * | 7/2009 | Eidehall ........... | B60W 50/0097 |
| | | | | 701/300 |
| 2011/0035106 | A1 * | 2/2011 | Hauler ................ | B62D 15/025 |
| | | | | 701/1 |
| 2015/0251656 | A1 * | 9/2015 | Yester ................... | B60W 30/09 |
| | | | | 701/41 |
| 2016/0221604 | A1 * | 8/2016 | Yamaoka ............. | B62D 15/025 |
| 2016/0304126 | A1 * | 10/2016 | Yamaoka .............. | B60K 35/22 |
| 2017/0120912 | A1 * | 5/2017 | Ishioka ................. | B60W 30/16 |
| 2017/0217422 | A1 | 8/2017 | Nakamura | |
| 2017/0329000 | A1 * | 11/2017 | Masui .................. | B60W 30/16 |
| 2017/0329331 | A1 * | 11/2017 | Gao ................. | B60W 50/0098 |
| 2018/0178802 | A1 * | 6/2018 | Miyata ............... | B60W 30/095 |
| 2019/0001937 | A1 * | 1/2019 | Ito ......................... | B60W 30/09 |
| 2019/0092331 | A1 * | 3/2019 | Ide ........................ | B60W 10/20 |
| 2020/0017107 | A1 * | 1/2020 | Takahashi ........... | B60W 30/143 |
| 2020/0108830 | A1 * | 4/2020 | Grelaud ......... | B60W 30/18163 |
| 2020/0198634 | A1 * | 6/2020 | Yashiro ................... | G08G 1/16 |
| 2020/0250991 | A1 * | 8/2020 | Kallenbach .......... | G05D 1/0291 |
| 2020/0307597 | A1 * | 10/2020 | Oka ............... | B60W 30/18163 |
| 2020/0307691 | A1 * | 10/2020 | Kalabic .............. | B62D 15/0255 |
| 2021/0009124 | A1 | 1/2021 | Hayakawa | |
| 2021/0245740 | A1 * | 8/2021 | George .......... | B60W 30/18163 |
| 2021/0383693 | A1 * | 12/2021 | Park .................... | G08G 1/0965 |
| 2021/0407313 | A1 * | 12/2021 | Urano .............. | B60W 50/0225 |
| 2022/0073071 | A1 * | 3/2022 | Grelaud ............. | B60W 60/001 |
| 2022/0135165 | A1 | 5/2022 | Tamashima et al. | |
| 2023/0166767 | A1 * | 6/2023 | Xiang .............. | B60W 60/0015 |
| | | | | 701/23 |
| 2024/0025401 | A1 * | 1/2024 | Hosokawa ........... | B60W 10/20 |
| 2024/0262379 | A1 * | 8/2024 | Kempe ................. | B60W 50/14 |
| 2025/0222956 | A1 * | 7/2025 | Liu ........................ | G08G 1/162 |

FOREIGN PATENT DOCUMENTS

| | | |
|---|---|---|
| WO | 2016/024317 | 2/2016 |
| WO | 2020/202283 | 10/2020 |

* cited by examiner

DRIVING ASSISTANCE CONTROL DEVICE

TECHNICAL FIELD

The present invention relates to a driving assistance (assist) control device for a saddle-type vehicle.

BACKGROUND ART

JP 2007-272445 A discloses a driving assist control device for four-wheeled vehicles. The driving assist control device performs driving assist control for a user's own vehicle when another vehicle traveling in parallel with the user's own vehicle is present in a lane adjacent to the lane in which the user's own vehicle is traveling.

SUMMARY OF THE INVENTION

When the user's own vehicle is a saddle-type vehicle, there may be another vehicle that is a saddle-type vehicle traveling parallel to the user's own vehicle in the same lane as the lane in which the user's own vehicle is traveling. The driving assist control device disclosed in JP 2007-272445 A has a problem that it cannot perform appropriate driving assist control for the user's own vehicle when another vehicle traveling in parallel with the user's own vehicle is present in the same lane as the lane in which the user's own vehicle is traveling.

The present invention aims to solve the above-mentioned problems.

The present invention relates to a driving assist control device for a saddle-type vehicle.

A first configuration includes: an inter-vehicle distance acquisition unit that acquires an inter-vehicle distance in a vehicle width direction between a user's own vehicle and a parallel-traveling vehicle that is another saddle-type vehicle traveling in parallel in the same lane as the lane in which the user's own vehicle is traveling; a road condition acquisition unit that acquires a condition of a road on which the user's own vehicle is traveling; a target inter-vehicle distance setting unit that sets a target inter-vehicle distance in the vehicle width direction between the user's own vehicle and the parallel-traveling vehicle according to the condition of the road; and an operation assist unit that assists, based on the inter-vehicle distance and the target inter-vehicle distance, a driver in a driving operation by means of a steering actuator (32) that is mounted in the saddle-type vehicle (10) and applies assist torque to a steering system (22) in relation to steering torque, wherein the operation assist unit (96) continues the assist in the driving operation while a distance between the user's own vehicle and a while line of the lane on a side of the user's own vehicle opposite to a side where the parallel-traveling vehicle is present.

As a second configuration, the road condition acquisition unit acquires the width of the lane in which the user's own vehicle is traveling, and the target inter-vehicle distance setting unit sets the target inter-vehicle distance in a manner so that the wider the width of the lane in which the user's own vehicle is traveling, the longer the target inter-vehicle distance.

As a third configuration, the road condition acquisition unit acquires the width of the lane in which the user's own vehicle is traveling, and the target inter-vehicle distance setting unit sets the target inter-vehicle distance in a manner so that the narrower the width of the lane in which the user's own vehicle is traveling is, the shorter the target inter-vehicle distance. As a fourth configuration, the operation assist unit (96) judges whether the driver has performed an operation to avoid approaching the parallel-traveling vehicle before the assist in the driving operation, and in a case where the driver has performed the operation to avoid approaching the parallel-traveling vehicle, the operation assist unit (96) does not assist the driver in the driving operation.

As a benefit of the present invention, according to the first configuration, when there is another vehicle traveling in parallel with the user's own vehicle in the same lane as the lane in which the user's own vehicle is traveling, an appropriate driving assist control can be performed for the user's own vehicle.

The second configuration enables providing the driver of the user's own vehicle with an easy-to-drive situation.

The third configuration enables maintaining the parallel traveling between the user's own vehicle and the parallel-traveling vehicle. The fourth configuration enables performing a proper driving assist control for the user's own vehicle when there is another vehicle traveling in parallel with the user's own vehicle in the same line as the lane in which the user's own vehicle is traveling.

DETAILED DESCRIPTION OF THE INVENTION

First Embodiment

Configuration of Saddle-Type Vehicle

Figure 1:
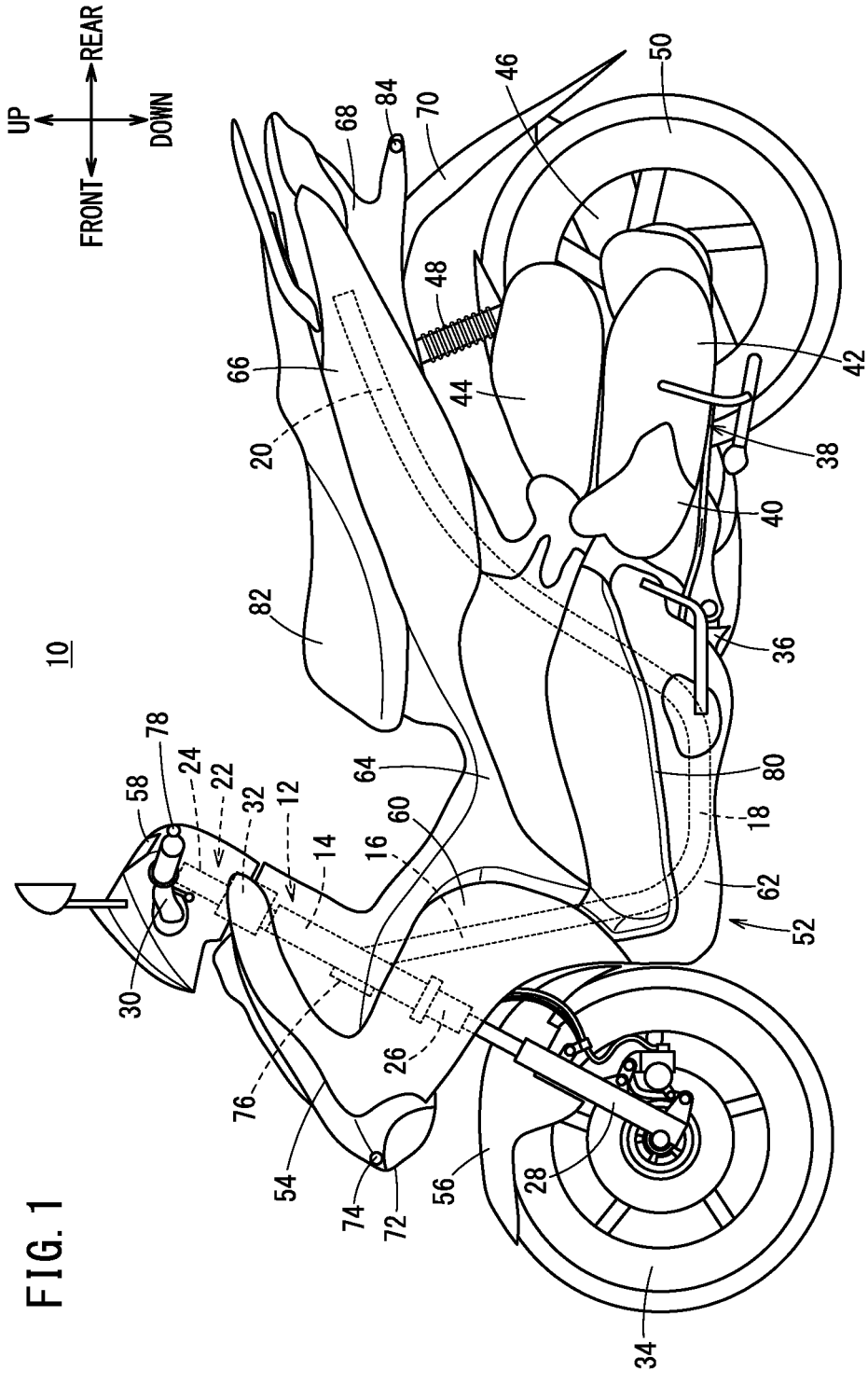
FIG. 1 is a side view of a saddle-type vehicle.

FIG. 1 is a side view of a saddle-type vehicle 10. In the following description, the directions of front, back, up, and down are described based on the directions indicated by the arrows in FIG. 1. When a driver is riding on the saddle-type vehicle 10 facing forward, the left-hand side of the driver is described as left, and the right-hand side of the driver is described as right.

The saddle-type vehicle 10 of the present embodiment is a scooter type motorcycle. The saddle-type vehicle 10 may be a motorcycle other than the scooter type. The saddle-type vehicle 10 may be a tricycle, a quadricycle, or the like.

The saddle-type vehicle 10 has a body frame 12. The body frame 12 includes a head pipe 14, a down frame 16, a lower frame 18, and a rear frame 20.

The head pipe 14 extends down forward. The down frame 16 extends from the head pipe 14 in a down rearward direction. The lower frame 18 branches to the left and right from the lower end of the down frame 16. The lower frame 18 having branched to the left and right extends rearward. The rear frame 20 extends from the rear ends of the left and right lower frames 18 in an up rearward direction.

The saddle-type vehicle 10 has a steering system 22. The steering system 22 includes a steering stem 24, a bottom bridge 26, a front fork 28, a steering wheel 30, and a steering actuator 32.

The steering stem 24 is inserted into the interior of the head pipe 14. The head pipe 14 supports the steering stem 24 in a rotatable manner. The front fork 28 is connected to the lower end of the steering stem 24 via the bottom bridge 26. The front fork 28 splits to the left and right at its upper end. The front fork 28, which has divided into the left and right, extends down forward. The front wheel 34 is attached to the lower end of the front fork 28. The front wheel 34 is supported by both the left and right front forks 28 in a rotatable manner.

The steering wheel 30 is attached to the upper end of the steering stem 24. The driver steers the steering wheel 30, whereby the front wheel 34 changes direction. The steering stem 24 is provided with the steering actuator 32. The steering actuator 32 applies assist torque to the steering stem 24 in relation to steering torque applied by the driver to the steering wheel 30.

A swing unit 38 is connected to the rear end of the lower frame 18 via a link mechanism 36. The swing unit 38 has an engine 40, a continuously variable transmission 42, and an air cleaner 44. The continuously variable transmission 42 is provided rearward of the engine 40. The air cleaner 44 is provided above the continuously variable transmission 42. A muffler 46 is attached to the right side of the saddle-type vehicle 10.

A rear suspension 48 is attached to each of the left and right rear frames 20. The rear suspension 48 extends in a down rearward direction. A rear wheel 50 is attached to the lower end of the rear suspension 48. The rear wheel 50 is supported on the left and right rear suspensions 48 in a rotatable manner.

The body frame 12 is covered by a vehicle body cover 52 made of synthetic resin. The vehicle body cover 52 includes a front cover 54, a front fender 56, a handle cover 58, a leg shield 60, a lower cover 62, a center tunnel 64, a side cover 66, a rear under cover 68, and a rear fender 70.

The front cover 54 covers the head pipe 14. The front cover 54 is provided with a headlight 72. The front cover 54 is provided with a front-view camera 74. The front-view camera 74 is a stereo camera. The front-view camera 74 captures a three-dimensional image of a view in front of the saddle-type vehicle 10. The front fender 56 covers upper and rear sides of the front wheel 34. A driving assist control device 76 is provided on an inner side of the front cover 54. The handle cover 58 covers a widthwise central portion of the steering wheel 30 and the steering stem 24. The handle cover 58 is provided with a notification unit 78. The notification unit 78 is controlled by the driving assist control device 76. The notification unit 78 is, for example, a light-emitting diode lamp. The leg shield 60 covers the down frame 16 and the front side of the driver's leg.

The lower cover 62 covers the outer sides of the left and right lower frames 18. The upper surface of the lower cover 62 is provided with steps 80 on the left and right sides, respectively. The center tunnel 64 is provided between the left and right steps 80. A fuel tank (not shown) is disposed inside the center tunnel 64. The side covers 66 cover the outer sides of the left and right rear frames 20. The sheet 82 is attached to an upper part of the side cover 66. The rear under cover 68 covers part of a lower opening of the side cover 66. The rear under cover 68 is provided with a rear-view camera 84. The rear-view camera 84 is a stereo camera. The rear-view camera 84 captures a three-dimensional image of a view behind the saddle-type vehicle 10. The rear fender 70 covers the upper and rear sides of the rear wheel 50.

Configuration of Driving Assist Control Device

Figure 2:
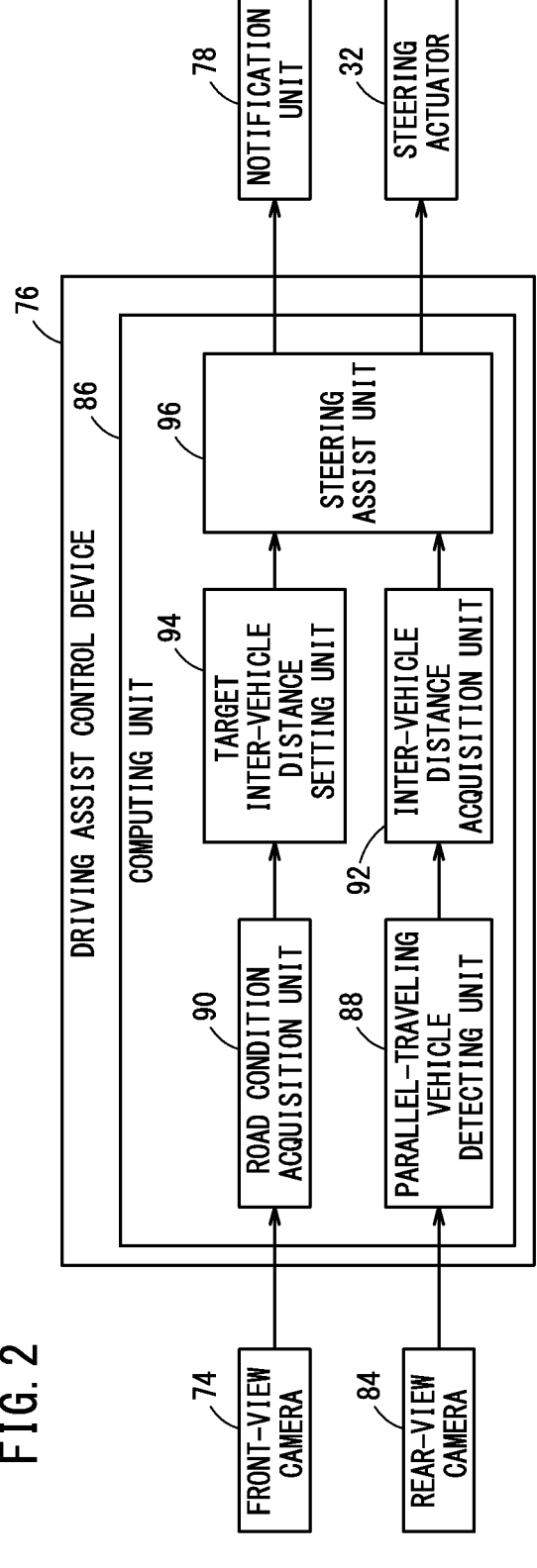
FIG. 2 is a control block diagram of a driving assist control device.

FIG. 2 is a control block diagram of the driving assist control device 76. The driving assist control device 76 has a computing unit 86. The computing unit 86 is implemented by a processing circuit. The processing circuit is configured by an integrated circuit such as an ASIC (Application Specific Integrated Circuit), an FPGA (Field-Programmable Gate Array), or the like. The processing circuit may be configured by electronic circuitry including discrete devices. The processing circuit may be configured by a processor such as a CPU (Central Processing Unit), a GPU (Graphics Processing Unit), or the like. In this case, the processing circuit is implemented by the processor executing a program stored in a storage unit (not shown).

The computing unit 86 includes a parallel-traveling vehicle detecting unit 88, a road condition acquisition unit 90, an inter-vehicle distance acquisition unit 92, a target inter-vehicle distance setting unit 94, and a steering assist unit 96.

The parallel-traveling vehicle detecting unit 88 performs a parallel-traveling vehicle detecting process. The parallel-traveling vehicle detecting process is a process of detecting other saddle-type vehicles that travel parallel to the user's own vehicle in the same lane, by analyzing an image taken by the rear-view camera 84. The other saddle-type vehicles traveling parallel to the user's own vehicle indicates saddle-type vehicles that overlap the user's own vehicle in the front-rear direction among other saddle-type vehicles located rearward of the user's own vehicle. Hereinafter, a saddle-type vehicle that travels in parallel in the same lane as the lane in which the user's own vehicle travels may be referred to as a parallel-traveling vehicle. When the saddle-type vehicle 10 is equipped with LiDAR (Light Detection And Ranging), the parallel-traveling vehicle detecting unit 88 may perform the parallel-traveling vehicle detecting process using the information on the three-dimensional positions measured by LIDAR. When the saddle-type vehicle 10 and the parallel-traveling vehicle are equipped with the inter-vehicle communication capable of transmitting and receiving positional information by communication, the parallel-traveling vehicle detecting unit 88 may perform the parallel-traveling vehicle detecting process using the positional information of the parallel-traveling vehicle received by the inter-vehicle communication.

The inter-vehicle distance acquisition unit 92 performs an inter-vehicle distance acquiring process. The inter-vehicle distance acquiring process is a process that acquires the distance between the user's own vehicle and the parallel-traveling vehicle in the vehicle width direction using the information on the position of the parallel-traveling vehicle acquired in the parallel-traveling vehicle detecting unit 88. Hereinafter, the distance between the user's own vehicle and the parallel-traveling vehicle in the vehicle width direction may be referred to as an inter-vehicle distance.

The road condition acquisition unit 90 performs a lane width acquiring process. The lane width acquiring process is a process of acquiring the width of the lane in which the user's own vehicle is traveling. In the lane width acquiring process, features defining a range of the lane such as white lines are detected by analyzing an image captured by the front-view camera 74. In the lane width acquisition process, the width of the lane is acquired based on the position of the detected features. When the saddle-type vehicle 10 is equipped with a LIDAR, the road condition acquisition unit 90 may perform the lane width acquiring process using the information on the three-dimensional positions measured by the LiDAR. When the saddle-type vehicle 10 is equipped with a navigation system including map data having information on the widths of lanes, the road condition acquisition unit 90 may perform the lane width acquiring process using the information on the widths of lanes in the map data.

The target inter-vehicle distance setting unit 94 performs a target inter-vehicle distance setting process. In the target inter-vehicle distance setting process, a target value of the inter-vehicle distance between the user's own vehicle and the parallel-traveling vehicle is set based on the width of the lane obtained in the road condition acquisition unit 90. In the following, the target value of the inter-vehicle distance between the user's own vehicle and the parallel-traveling vehicle may be referred to as a target inter-vehicle distance. The target inter-vehicle distance setting unit 94 sets the target inter-vehicle distance in a manner so that the wider the width of the lane, the longer the target inter-vehicle distance. The target inter-vehicle distance setting unit 94 sets the target inter-vehicle distance in a manner so that the narrower the width of the lane, the shorter the target inter-vehicle distance. For example, when the width of the lane is 4 [m], the target inter-vehicle distance is set to 2 [m]. For example, when the width of the lane is 3 [m], the target inter-vehicle distance is set to 1.5 [m].

The steering assist unit 96 performs the notification process and the steering assist process. In the notification process, when the inter-vehicle distance between the user's own vehicle and the parallel-traveling vehicle is less than the target inter-vehicle distance, the steering assist unit 96 controls the notification unit 78 to inform the driver. This enables the driver to recognize that the parallel-traveling vehicle is approaching the user's own vehicle. In the steering assist process, when the inter-vehicle distance between the user's own vehicle and the parallel-traveling vehicle is less than the target inter-vehicle distance, the steering assist unit 96 controls the steering actuator 32 to apply the assist torque to the steering stem 24. This encourages the driver to steer the steering wheel 30 in the direction away from the parallel-traveling vehicle.

Driving Assistance Control Process

Figure 3:
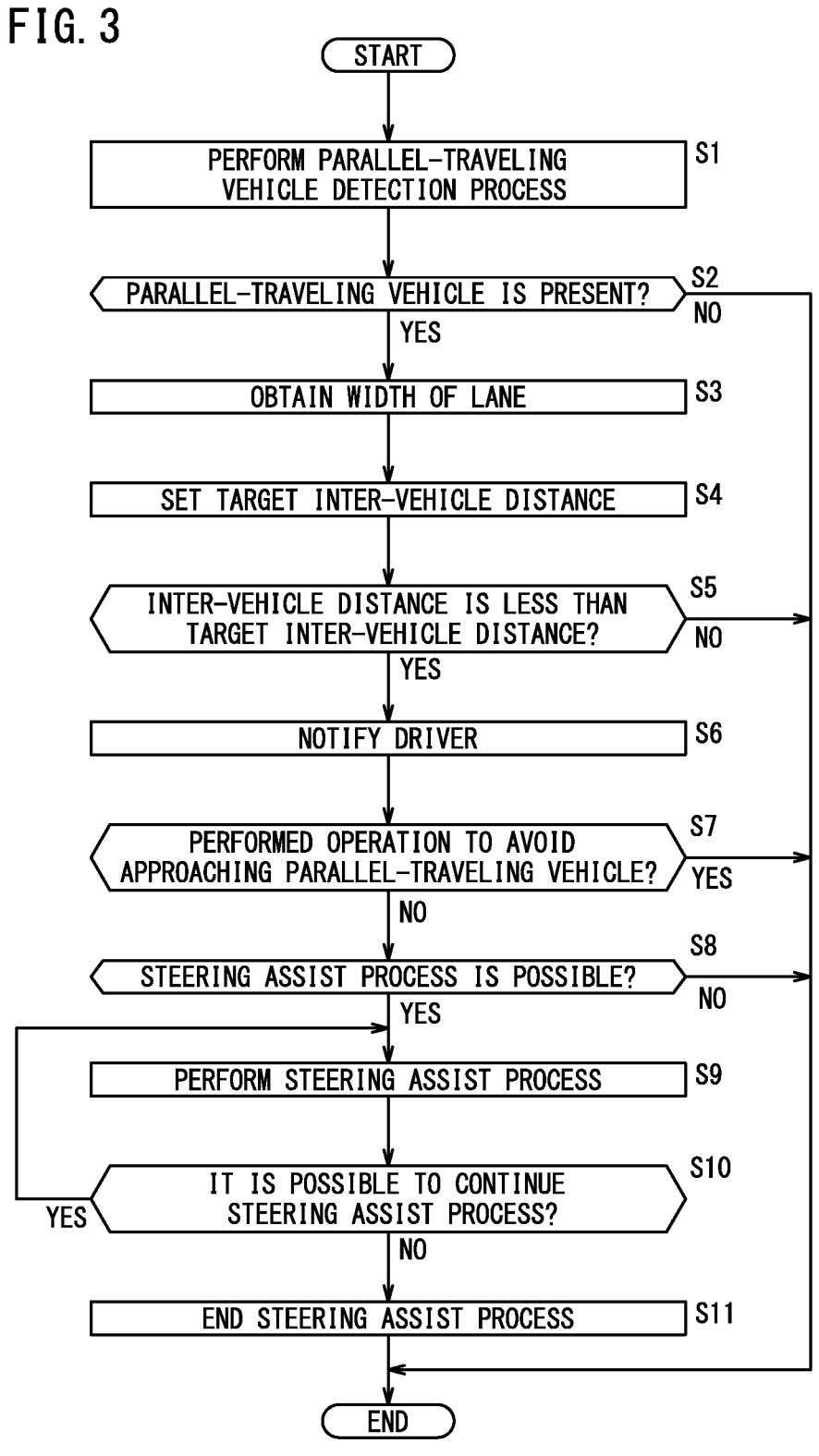
FIG. 3 is a flowchart showing a flow of a driving assist control process executed in the driving assist control device.

FIG. 3 is a flowchart showing the flow of the driving assist control process executed by the driving assist control device 76. The driving assist control process is executed at a predetermined cycle while the saddle-type vehicle 10 is traveling.

In step S1, the parallel-traveling vehicle detection unit 88 performs a parallel-traveling vehicle detection process. Then, the process proceeds to step S2.

In step S2, the parallel-traveling vehicle detection unit 88 determines whether or not a parallel-traveling vehicle is present. If there is a parallel-traveling vehicle (step S2: YES), the process proceeds to step S3. If there is no parallel-traveling vehicle (step S2: NO), the driving assist control process ends.

In step S3, the road condition acquisition unit 90 obtains the width of the lane in which the user's own vehicle is traveling. Then, the process proceeds to step S4.

In step S4, the target inter-vehicle distance setting unit 94 sets the target inter-vehicle distance. Then, the process proceeds to step S5.

In step S5, the inter-vehicle distance acquisition unit 92 determines whether the inter-vehicle distance is less than the target inter-vehicle distance. If the inter-vehicle distance is less than the target inter-vehicle distance (step S5: YES), the process proceeds to step S6. If the inter-vehicle distance is equal to or larger than the target inter-vehicle distance (step S5: NO), the driving assist control process ends.

In step S6, the steering assist unit 96 controls the notification unit 78 to notify the driver. Then, the process proceeds to step S7.

In step S7, the steering assist unit 96 determines whether the driver has steered the vehicle to avoid approaching the parallel-traveling vehicle. If the driver has performed an operation to avoid approaching the parallel-traveling vehicle (step S7: YES), the driving assist control process ends. When the driver does not perform the operation to avoid approaching the parallel-traveling vehicle (step S7: NO), the process proceeds to step S8. The operation by which the driver avoids approaching the parallel-traveling vehicle is, for example, that the driver steers the steering wheel 30 in the direction opposite to the parallel-traveling vehicle. The operation by the driver to avoid approaching the parallel-traveling vehicle may refer to, for example, an operation by the driver to increase a rotation amount of a throttle grip (not shown) in order to accelerate the user's own vehicle.

In step S8, the steering assist unit 96 determines whether the steering assist process is possible. If the steering assist process is possible (step S8: YES), the process proceeds to step S9. If the steering assist process is not possible (step S8: NO), the driving assist control process ends.

The case where the steering assist process is possible is, for example, the case where the distance between the user's own vehicle and a white line of the lane on the side of the user's own vehicle opposite to the side where the parallel-traveling vehicle is present is equal to or more than a predetermined distance. In this case, the user's own vehicle can move toward the side in the lane opposite to the side where the parallel-traveling vehicle is present. Therefore, the steering assist process in the next step S9 is performed.

The case where the steering assist process is not possible is, for example, the case where the distance between the user's own vehicle and a white line of the lane on the side of the user's own vehicle opposite to the side where the parallel-traveling vehicle is present is less than a predetermined distance. In this case, the user's own vehicle cannot move toward the side in the lane opposite to the side where the parallel-traveling vehicle is present. Therefore, the steering assist process in the next step S9 is not performed, and the driving assist control process ends.

In step S9, the steering assist unit 96 performs a steering assist process. Then, the process proceeds to step S10. The steering assist unit 96 controls the steering actuator 32 to apply assist torque to the steering stem 24. This encourages the driver to steer the steering wheel 30 in the direction away from the parallel-traveling vehicle.

In step S10, the steering assist unit 96 determines whether or not it is possible to continue the steering assist process. If it is possible to continue the steering assist process (step S10: YES), the process returns to step S9. If it is impossible to continue the steering assist process (step S10: NO), the process proceeds to step S11.

The case where the steering assist process can be continued is, for example, the case where the distance between the user's own vehicle and a white line of the lane on the side of the user's own vehicle opposite to the side where the parallel-traveling vehicle is present is equal to or more than a predetermined distance. In this case, the user's own vehicle can move toward the side in the lane opposite to the side where the parallel-traveling vehicle is present. Therefore, the steering assist process in step S9 is continued.

The case where the steering assist process can be continued is, for example, the case where the inter-vehicle distance is less than the target inter-vehicle distance. In this case, since the user's own vehicle needs to be further away from the parallel-traveling vehicle, the steering assist process in step S9 is continued.

The case where the steering assist process is not possible is, for example, the case where the distance between the user's own vehicle and a white line of the lane on the side of the user's own vehicle opposite to the side where the parallel-traveling vehicle is present is less than a predetermined distance. In this case, the user's own vehicle cannot move toward the side in the lane opposite to the side where the parallel-traveling vehicle is present. Therefore, the steering assist process in step S9 is not continued.

The case where it is impossible to continue the steering assist process is, for example, the case where the inter-vehicle distance is equal to or larger than the target inter-vehicle distance. In this case, because it is not necessary to move the user's own vehicle further away from the parallel-traveling vehicle, the steering assist process in step S9 is not continued.

In step S11, the steering assist unit 96 ends the steering assist process. Then, the driving assist control process ends.

Operations and Effects

A driving assist control device for four-wheeled vehicles has been known. The driving assist control device for a four-wheeled vehicle assists a driver of the user's own vehicle in performing driving operations when there is another vehicle traveling in parallel with the user's own vehicle in the adjacent lane in which the user's own vehicle is traveling.

There is a case where another vehicle is traveling parallel to the user's own vehicle in the same lane as the lane in which the user's own vehicle is traveling, and both the user's own vehicle and the other vehicle are saddle-type vehicles. In such a case, the driving assist control device for the saddle-type vehicle is also required to assist the driver of the user's own vehicle in the driving operations.

In the case of the driving assist control device 76 of the present embodiment, the steering assist unit 96 assists the driving operations of the driver of the user's own vehicle when there is a parallel-traveling vehicle. The parallel-traveling vehicle is another saddle-type vehicle that travels parallel to the user's own vehicle in the same lane as the lane in which the user's own vehicle is traveling. The assist of the driving operations is performed based on the inter-vehicle distance between the user's own vehicle and the parallel-traveling vehicle and the target inter-vehicle distance between the user's own vehicle and the parallel-traveling vehicle. The target inter-vehicle distance setting unit 94 sets the target inter-vehicle distance in accordance with road conditions. This allows the inter-vehicle distance between the user's own vehicle and the parallel-traveling vehicle to be maintained at a distance that is appropriate for the road conditions.

In the case of the driving assist control device 76 of the present embodiment, the target inter-vehicle distance setting unit 94 sets the target inter-vehicle distance in a manner so that the wider the width of the lane in which the user's own vehicle is traveling, the longer the target inter-vehicle distance. The target inter-vehicle distance setting unit 94 sets the target inter-vehicle distance in a manner so that the narrower the width of the lane in which the user's own vehicle is traveling, the shorter the target inter-vehicle distance.

Figure 4:
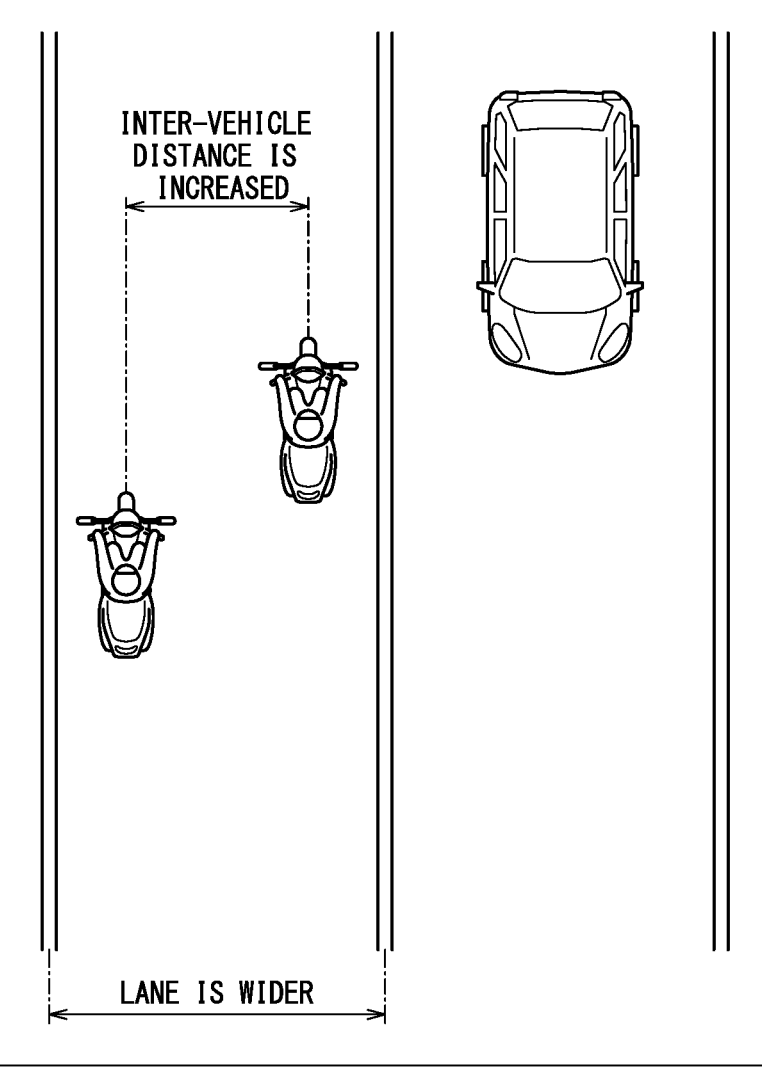
FIG. 4 is a schematic diagram showing a situation where the user's own vehicle and a parallel-traveling vehicle are traveling.
Figure 5:
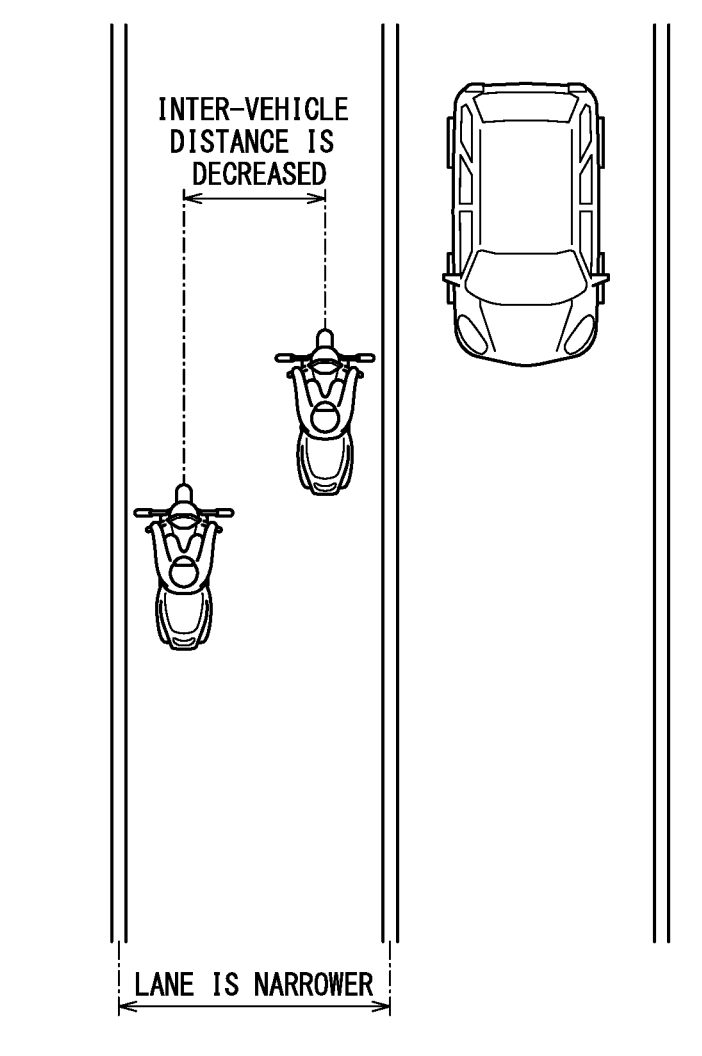
FIG. 5 is a schematic diagram showing a situation where the user's own vehicle and a parallel-traveling vehicle are traveling.

FIGS. 4 and 5 are schematic diagrams showing a situation where the user's own vehicle and the parallel-traveling vehicle are traveling. FIG. 4 shows the situation when the lane is wider. FIG. 5 shows the situation when the lane is narrower.

The target inter-vehicle distance setting unit 94 sets the target inter-vehicle distance as described above, whereby the inter-vehicle distance between the user's own vehicle and the other vehicle can be increased when the lane is wider as shown in FIG. 4. Therefore, it is possible to provide the driver of the user's own vehicle with an easy-to-drive situation.

The target inter-vehicle distance setting unit 94 sets the target inter-vehicle distance as described above, whereby the inter-vehicle distance between the user's own vehicle and the other vehicle can be decreased when the lane is narrower as shown in FIG. 5. Therefore, the parallel driving between the user's own vehicle and the parallel driving vehicle can be maintained.

Second Embodiment

In the first embodiment, the driving assist control device 76 is mounted only on the saddle-type vehicle 10 of the user's own vehicle. In the present embodiment, the driving assist control device 76 is mounted on both the saddle-type vehicle 10 of the user's own vehicle and the saddle-type vehicle 10 of the parallel-traveling vehicle.

When the driving assist control device 76 is mounted on both the saddle-type vehicle 10 of the user's own vehicle and the saddle-type vehicle 10 of the parallel-traveling vehicle, the driving assist control device 76 of the user's own vehicle and the driving assist control device 76 of the parallel-traveling vehicle may cooperate to maintain the inter-vehicle distance between the user's own vehicle and the parallel-traveling vehicle.

For example, when the distance between the user's own vehicle and the white line of the lane on the side of the user's own vehicle opposite to the side where the parallel-traveling vehicle is present is less than the predetermined distance, the driving assist control device 76 of the user's own vehicle does not perform the driving assist control, and the driving assist control device 76 of the parallel-traveling vehicle performs the driving assist control.

The present invention is not limited to the above-described embodiment, and various configurations can be adopted without departing from the scope of the present invention.

Invention Derived from Embodiment

The invention that can be understood from the above embodiments will be described below.

The driving assist control device (76) for the saddle-type vehicle (10) includes the inter-vehicle distance acquisition unit (92) that acquires the inter-vehicle distance in the vehicle width direction between the user's own vehicle and the parallel-traveling vehicle that is another saddle-type vehicle traveling in parallel in the same lane as the lane in which the user's own vehicle is traveling, the road condition acquisition unit (90) that acquires the condition of the road on which the user's own vehicle is traveling, the target inter-vehicle distance setting unit (94) that sets the target inter-vehicle distance in the vehicle width direction between the user's own vehicle and the parallel-traveling vehicle according to the condition of the road, and the operation assist unit (96) that assists the driving in the driving operation based on the inter-vehicle distance and the target inter-vehicle distance. Thus, when there is another vehicle traveling in parallel with the user's own vehicle, an appropriate driving assist control can be performed for the user's own vehicle.

In the above driving assist control device (76), the road condition acquisition unit (90) may acquire the width of the lane in which the user's own vehicle is traveling, and the target inter-vehicle distance setting unit (94) may set the target inter-vehicle distance in a manner so that the wider the width of the lane in which the user's own vehicle is traveling, the longer the target inter-vehicle distance. Thus, it is possible to provide the driver of the user's own vehicle with an easy-to-drive situation.

In the above driving assist control device (76), the road condition acquisition unit (90) may acquire the width of the lane in which the user's own vehicle is traveling, and the target inter-vehicle distance setting unit (94) may set the target inter-vehicle distance in a manner so that the narrower the width of the lane in which the user's own vehicle is traveling, the shorter the target inter-vehicle distance. This makes it possible to maintain the parallel traveling between the user's own vehicle and the parallel-traveling vehicle.

REFERENCE SIGNS LIST

10: saddle-type vehicle
76: driving assist control device
90: road condition acquisition unit
94: target inter-vehicle distance setting unit
96: steering assist unit (operation assist unit)

What is claim is:

1. A driving assist control device for a saddle-type vehicle, the driving assist control device comprising
one or more processing circuit,
wherein the one or more processing circuit is configured to:
acquire an inter-vehicle distance in a vehicle width direction between a user's own vehicle and a parallel-traveling vehicle that is another saddle-type vehicle traveling in parallel in a same lane as a lane in which the user's own vehicle is traveling;
acquire a condition of a road on which the user's own vehicle is traveling;
set a target inter-vehicle distance in the vehicle width direction between the user's own vehicle and the parallel-traveling vehicle according to the condition of the road;

assist, based on the inter-vehicle distance and the target inter-vehicle distance, a driver in a driving operation by means of a steering actuator that is mounted in the saddle-type vehicle and applies assist torque to a steering system in relation to steering torque;
control the steering actuator to apply, to the steering system, assist torque that encourages the driver to steer the user's own vehicle in a direction away from the parallel-traveling vehicle, while it is determined that a distance between the user's own vehicle and a white line of the lane on a side of the user's own vehicle opposite toa side where the parallel-traveling vehicle is present is equal to or more than a predetermined distance; and
stop applying the assist torque to the steering system in a case where it is determined that the distance between the user's own vehicle and the white line of the lane on the side of the user's own vehicle opposite to the side where the parallel-traveling vehicle is present is less than the predetermined distance.

2. The driving assist control device according to claim 1, wherein
the one or more processing circuit is configured to
acquire a width of the lane in which the user's own vehicle is traveling, and
set the target inter-vehicle distance in a manner so that the wider the width of the lane in which the user's own vehicle is traveling, the longer the target inter-vehicle distance.

3. The driving assist control device according to claim 1, wherein
the one or more processing circuit is configured to
acquire a width of the lane in which the user's own vehicle is traveling, and
set the target inter-vehicle distance in a manner so that the narrower the width of the lane in which the user's own vehicle is traveling, the shorter the target inter-vehicle distance.

4. The driving assist control device according to claim 1, wherein
the one or more processing circuit is configured to
judge whether the driver has performed an operation to avoid approaching the parallel-traveling vehicle before the assist in the driving operation, and
in a case where the driver has performed the operation to avoid approaching the parallel-traveling vehicle, not assist the driver in the driving operation.

* * * * *